United States Patent
Erickson

(10) Patent No.: US 8,543,733 B1
(45) Date of Patent: *Sep. 24, 2013

(54) DCOM OBJECT CONTROL CREATOR

(75) Inventor: Joey L. Erickson, New Brighton, MN (US)

(73) Assignee: Unisys Corporation, Blue Bell, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/310,718

(22) Filed: May 12, 1999

(51) Int. Cl.
*G06F 15/16* (2006.01)

(52) U.S. Cl.
USPC .......................................... 709/246; 709/230

(58) Field of Classification Search
USPC ................. 709/200, 300, 301, 230, 203, 246;
707/103 R; 718/101; 719/315
See application file for complete search history.

(56) References Cited

U.S. PATENT DOCUMENTS

| | | | | |
|---|---|---|---|---|
| 5,754,772 A | * | 5/1998 | Leaf | 707/10 |
| 5,857,201 A | * | 1/1999 | Wright et al. | 707/104.1 |
| 5,875,306 A | * | 2/1999 | Bereiter | 709/220 |
| 5,920,725 A | * | 7/1999 | Ma et al. | 707/203 |
| 5,996,001 A | * | 11/1999 | Quarles et al. | 709/101 |
| 6,012,067 A | * | 1/2000 | Sarkar | 707/103 R |
| 6,014,666 A | * | 1/2000 | Helland et al. | 707/10 |
| 6,029,174 A | * | 2/2000 | Sprenger et al. | 707/103 R |
| 6,032,198 A | * | 2/2000 | Fujii et al. | 719/328 |
| 6,035,301 A | * | 3/2000 | Siegel et al. | 707/102 |
| 6,078,918 A | * | 6/2000 | Allen et al. | 707/6 |
| 6,085,220 A | * | 7/2000 | Courts et al. | 709/201 |
| 6,115,744 A | * | 9/2000 | Robins et al. | 709/203 |
| 6,141,679 A | * | 10/2000 | Schaefer et al. | 709/201 |
| 6,141,696 A | * | 10/2000 | Goertzel et al. | 719/310 |
| 6,167,442 A | * | 12/2000 | Sutherland et al. | 709/217 |
| 6,212,546 B1 | * | 4/2001 | Starkovich et al. | 709/203 |
| 6,272,675 B1 | * | 8/2001 | Schrab et al. | 717/100 |
| 6,298,391 B1 | * | 10/2001 | Kennedy et al. | 719/328 |
| 6,321,251 B1 | * | 11/2001 | Deisinger et al. | 709/203 |
| 6,324,681 B1 | * | 11/2001 | Sebesta et al. | 717/102 |
| 6,377,975 B1 | * | 4/2002 | Florman | 709/203 |
| 6,397,220 B1 | * | 5/2002 | Deisinger et al. | 707/607 |
| 6,463,480 B2 | * | 10/2002 | Kikuchi et al. | 719/315 |
| 6,499,036 B1 | * | 12/2002 | Gurevich | 707/103 R |
| 6,643,679 B1 | * | 11/2003 | Erickson et al. | 718/101 |
| 6,721,776 B1 | * | 4/2004 | Erickson et al. | 718/101 |
| 6,925,595 B1 | * | 8/2005 | Whitledge et al. | 715/513 |
| 7,111,077 B1 | * | 9/2006 | Starkovich et al. | 709/246 |
| 8,099,501 B1 | * | 1/2012 | Erickson et al. | 709/227 |
| 2005/0216880 A1 | * | 9/2005 | Erickson et al. | 717/101 |

OTHER PUBLICATIONS

Harry Newton,"Newton's Telecom Dictionary", 1996, Flatiron Publishing, Inc., 10th Edition, p. 259.*

* cited by examiner

*Primary Examiner* — Oleg Survillo
(74) *Attorney, Agent, or Firm* — Robert P. Marley

(57) ABSTRACT

A control creator for developing controls to assist in DCOM client creation. A general-purpose gateway that runs within a Distributed Component Object Model (DCOM) environment, and is capable of receiving requests from one or more different types of DCOM clients for service by an On-Line Transaction Processing (OLTP) style application running on the enterprise server. The services on the OLTP system are designed to accomplish a specific task, for example, update a user's bank account balance following a debit or credit. The DCOM Client can be any type of client, including a Visual Basic client, C++ client, or a Web Browser with Active Server Pages (ASP). The control creator in effect wraps the DCOM server with a control which largely insulates the developer from the details of the DCOM protocol.

21 Claims, 15 Drawing Sheets

```
<HTML>
<HEAD>
<TITLE>NewPage</TITLE>
</HEAD>
<BODY>
   <OBJECT ID="Square1" WIDTH=100 HEIGHT=51
   CLASSID=CLSID:DB488736-3B8A-11D2-8A3B-00104B22E6AC
   CODEBASE="http://www.unisys.com/Square.ocx">
      <PARAM NAME="Version" VALUE="65636">
      <PARAM NAME="_ExtentX" VALUE="2846">
      <PARAM NAME="_ExtentY" VALUE="1323">
      <PARAM NAME="_StockProps" VALUE="0">
</OBJECT>
<OBJECT ID="txtIn" WIDTH=96 HEIGHT=24
CLASSID="CLSID:8BD21D10-EC42-11CE-9E0D-00AA006002F3">
      <PARAM NAME="VariousPropertyBits" VALUE="746604571">
      <PARAM NAME="Size" VALUE="2540;635">
      <PARAM NAME=FontCharSet" VALUE="0">
      <PARAM NAME="FontPitchAndFamily" VALUE="2">
<OBJECT>
<SCRIPT LANGUAGE="VBScript">
<!--
Sub CommandButton1_Click()
Square1.NumVal = txtIn.Text
call Square1.SquareIt()
txtOut.Text = Square1.Numval
end sub
-->
</SCRIPT>
   <OBJECT ID="CommandButton1" WIDTH=96 HEIGHT=32
   CLASSID=CLSID.D7053240-CE69-11CD-A77-00DD01143C57">
      <PARAM NAME="Caption" VALUE="Square Input">
      <PARAM NAME="Size" VALUE="2540;846">
      <PARAM NAME=FontCharSet" VALUE="0">
      <PARAM NAME="FontPitchAndFamily" VALUE="2">
      <PARAM NAME="ParagraphAlign" VALUE="3">
   </OBJECT>
</BODY>
</HTML>
```

FIG. 12

DCOM OBJECT CONTROL CREATOR

CROSS REFERENCE TO RELATED APPLICATIONS

The present application is related to U.S. patent application Ser. No. 09/164,932, filed Oct. 1, 1998, entitled "A MULTI-CLIENT USER CUSTOMIZED DCOM GATEWAY FOR AN OLTP ENTERPRISE SERVER APPLICATIONS" now abandoned; U.S. patent application Ser. No. 09/164,908, filed Oct. 1, 1998, entitled "AN AUTOMATED DEVELOPMENT SYSTEM FOR DEVELOPING APPLICATIONS THAT INTERFACE WITH BOTH DISTRIBUTED COMPONENT OBJECT MODEL (DCOM) AND ENTERPRISE SERVER ENVIRONMENTS" now U.S. Pat. No. 6,324,681 B1; and U.S. application ser. No. 09/164,759, filed Oct. 1, 1998, entitled "A COMMON GATEWAY WHICH ALLOWS APPLETS TO MAKE PROGRAM CALLS TO OLTP APPLICATIONS EXECUTING ON AN ENTERPRISE SERVER", which are assigned to the assignee of the present invention and incorporated herein by reference now U.S. Pat. No. 6,397,220 B1.

BACKGROUND OF THE INVENTION

1. Field of the Invention

The present invention relates to access to an enterprise server application from a Distributed Component Object Model (DCOM) environment, and more specifically, to a DCOM Object Control Creator (DOCC).

2. Description of the Prior Art

The methods by which companies conduct business with their customers are undergoing fundamental changes, due in large part to World Wide Web technology. In addition, the same technology that makes a company accessible to the world, may be used on internal company networks for conducting operational and administrative tasks.

One of the technologies underlying the World Wide Web is the prospect of using component software technology—the idea of breaking large, complex software applications into a series of pre-built and easily developed, understood, and changed software modules called components—as a means to deliver software solutions much more quickly and at a lower cost (source: DCOM: A Business Overview. The goal is to achieve economies of scale for software deployment across the industry.

A component architecture for building software applications will enable this by: 1) speeding development—enabling programmers to build solutions faster by assembling software from pre-built parts; 2) lowering integration costs—providing a common set of interfaces for software programs from different vendors means less custom work is required to integrate components into complete solutions; 3) improving deployment flexibility—making it easier to customize a software solution for different areas of a company by simply changing some of the components in the overall application; and 4) lowering maintenance costs—isolating software function into discreet components provides a low-cost, efficient mechanism to upgrade a component without having to retrofit the entire application.

A distributed component architecture applies these benefits across a broader scale of multiuser applications. The Distributed Component Object Model (DCOM), developed by Microsoft Corporation, has several strengths that make it a key technology for achieving this. Because it is an ActiveX technology, DCOM works natively with Internet technologies like TCP/IP, the Java language, and the HTTP network protocol, providing "object glue" that will enable business applications to work across the Web. DCOM is also an open technology that runs on multiple platforms.

DCOM has its roots in Microsoft's object technology, which has evolved over the last decade from DDE (Dynamic Data Exchange, a form of messaging between Windows programs), OLE (Object Linking and Embedding, embedding visual links between programs within an application), COM (the Component Object Model, used as the basis for all object binding), and ActiveX (COM enabled for the Internet). As stated earlier, applications built from components are simply easier to debug and evolve than large, monolithic applications.

The logical boundary for component applications is no longer on a single machine. Businesses want to leverage the benefits of component development across a broader set of shared applications that operate on multiple machines. These types of applications are referred to as "three-tier" or "n-tier" applications, where "tiers" of application logic, presentation services, business services, and information retrieval and management services, are broken into different components that can communicate directly with each other across a network. To the end user, these applications appear as a seamless extension of their existing desktop environment.

The simplicity, ubiquity, and industry momentum of standard Internet protocols like HTTP make it an ideal technology for linking components together for applications that span machine boundaries. HTTP is easy to program, is inherently cross-platform, and supports an accessible, universal naming service. Much of the excitement around the Java language derives from its potential as a mechanism to build distributed component applications on the Internet. In addition to Java support, DCOM enables components written in other languages, including C, COBOL, Basic, and Pascal, to communicate over the Internet, providing a growth path for existing applications to support Web technology.

As distributed component architectures, such as DCOM, are making their mark as a technology that enables software components to communicate directly with each other across networks, many businesses have a wealth of information that is managed by prior art data base management systems such as DMS, RDMS, DB2, Oracle, Ingres, Sybase, Informix, and many others. In addition, many of the database management systems are available as resources in a larger transaction processing system.

One key to the future success of a business may lie in its ability to capitalize on the ability to interconnect a distributed component architecture, such as DCOM, with existing enterprise On-line Transaction Processing (OLTP) systems. It defeats the two main goals of component-based development, fast time-to-market and lower development costs, if companies are forced to "hand code" into their component applications the mission critical services that are required for online production systems.

A major problem in making such heterogeneous, multi-platform systems user friendly, revolves around the unavailability of tools to generate new and/or modified application objects from the desktop client position. This is particularly troubling when the client may be not completely familiar with the operating environment and command language of the desired application object.

SUMMARY OF THE INVENTION

The present invention overcomes many of the disadvantages associated with the prior art by providing a facility for the creation of ActiveX controls. These controls are used to aid in DCOM client creation. They basically wrap the DCOM server by presenting an easy to use control to the client developer. First, the control must be created. This is done by running the DCOM Object Control Creator (DOCC) tool of the present invention, producing code snippets which are pulled into a C++ project to create the control (.OCX file). The control can then be used when creating the DCOM client by pulling it in to the project at client build time. Once the client is created, the control is also used at runtime, its own methods invoked, which call the wrapped DCOM server.

The DCOM Client/Server Application is provided visibility to available services generated in accordance with the present invention from an enterprise OLTP system such as the Unisys 2200 because the Application is linked to a library built from an Enterprise OLTP service view file. This view file defines how input parameters will be provided to the OLTP service, including information on where each input parameter is located in the view file, and the size and type of each input parameter. If the Enterprise OLTP service is to provide output back to DCOM Client/Server Application, another output view file definition is required to communicate how the information will be presented within the output view buffer.

When an OLTP request is issued from a DCOM Client, the DCOM Client Application first builds a buffer containing the service call and the appropriate set of input parameters, then passes this information onto the DCOM Server. The DCOM Server receives the service calls from the DCOM Client Application, builds an input buffer from the input parameters, and passes the information to the DGate Gateway via a standard pipe. The DGate Gateway receives the input buffer from the DCOM Server by listening to the pipe. The DGate Gateway then forwards the input buffer to the communications program, which in a preferred embodiment is the Open/OLTP Pathway program. Finally, the communications program passes the input buffer to the enterprise node for processing by the requested service.

After the OLTP system services the request, a response is passed back via an output buffer to the DGate Gateway, which returns this buffer to the DCOM Server. DCOM Server then unpacks the output buffer into individual output parameters, and returns the parameters to the DCOM Client application.

BRIEF DESCRIPTION OF THE DRAWINGS

Other objects of the present invention and many of the attendant advantages of the present invention will be readily appreciated as the same becomes better understood by reference to the following detailed description when considered in connection with the accompanying drawings, in which like reference numerals designate like parts throughout the figures thereof and wherein:

FIG. 12 is listing of the code generated for the sample control;

DETAILED DESCRIPTION OF THE PREFERRED EMBODIMENTS

The detailed descriptions which follow are presented largely in terms of algorithms and symbolic representations of operations on data bits within a computer memory. These algorithmic descriptions and representations are the means used by those skilled in the data processing arts to most effectively convey the substance of their work to others skilled in the art.

An algorithm is here, generally, conceived to be a self-consistent sequence of steps leading to a desired result. These steps are those requiring physical manipulations of physical quantities. Usually, though not necessarily, these quantities take the form of electrical or magnetic signals capable of being stored, transferred, combined, compared, and otherwise manipulated. It proves convenient at times, principally for reasons of common usage, to refer to these signals as bits, values, elements, symbols, characters, terms, numbers or the like. It should be kept in mind, however, that all of these and similar terms are to be associated with the appropriate physical quantities and are merely convenient labels applied to these quantities.

Furthermore, the manipulations performed are often referred to in terms, such as adding or comparing, which are commonly associated with mental operations performed by a human operator. No such capability of a human operator is necessary, or desirable in most cases, in any of the operations described herein which form part of the present invention; the operations are machine operations. Useful machines for performing the operations of the present invention include general purpose digital computers or other similar devices. In all cases, it should be kept in mind the distinction between the method operations in operating a computer and the method of computation itself. The present invention related to method steps for operating a computer in processing electrical or other (e.g., mechanical, chemical) physical signals to generate other desired physical signals.

The present invention also relates to apparatus for performing these operations. This apparatus may be specially constructed for the required purposes or it may comprise a general purpose computer as selectively activated or reconfigured by a computer program stored in the computer. The algorithms present herein are not inherently related to a particular computer system or other apparatus. In particular, various general purpose computer systems may be used with computer programs written in accordance with the teachings of the present invention, or it may prove more convenient to construct more specialized apparatus, to perform the required method steps. The required structure for such machines will be apparent from the description given below.

Figure 1:
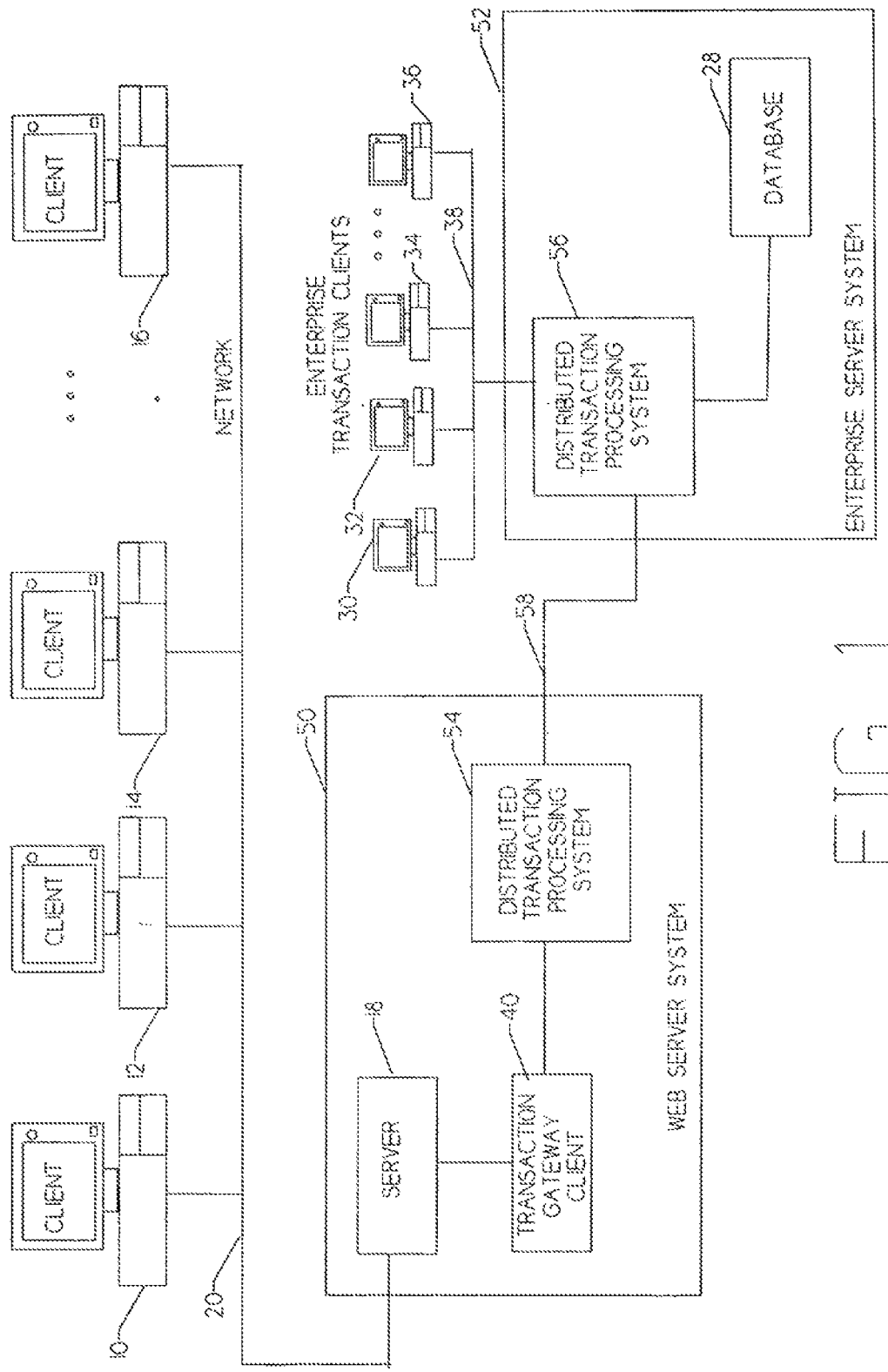
FIG. 1 is a functional block diagram of an exemplary computing environment in which the present invention could be used to make an enterprise based transaction processing system interoperable with a PC/Workstation based requestor.

FIG. 1 is a functional block diagram of an exemplary computing environment in which the present invention could be used to make an enterprise based transaction processing system interoperable with a PC/Workstation based requestor. A plurality of PC/Workstations, designated as Clients 10, 12, 14 and 16 are coupled to a Server 18 via Network 20. The Network 20 may be an internal local area network or the Internet.

Each of the Clients 10, 12, 14 and 16, is a Personal Computer/Workstation having operating system software and application software designed to provide Graphical User Interface (GUI) and communications capabilities which enable the Client to communicate with an associated Server application 18 via a Network 20.

The Workstation Server System 50 may be any class of machine(s) which are capable of running a Server application 18 along with a Distributed Transaction Processor 54. The Transaction Processing system 54 is designated as Distributed to make clear that a transaction is formatted on the Workstation Server System 50 and forwarded to the Enterprise Server system 52 for processing.

The exemplary Enterprise Server System 52 is a 2200 Series data processing system from Unisys and also includes a Distributed Transaction Processing System 56. The Distributed Transaction Processing System 56 is intended to encompass the same functionality as a monolithic transaction processing system, however, it is designated as Distributed to be compatible with the Distributed Transaction Processing System 54. The exemplary Distributed Transaction Processing Systems 54 and 56 are intended to encompass transaction manager software, such as Open/OLTP Transaction Manager software from Unisys, and user implemented Open/OLTP services. The Distributed Transaction Processing System 54 and the Distributed Transaction Processing System 56 are coupled via Network 58. Preferably, the network interface for Network 58 is separate from the network interface for Network 20.

The Distributed Transaction Processing System 56 serves data from the Database 28 to the Transaction Clients 30, 32, 34 and 36. The Transaction Clients 30, 32, 34 and 36 are coupled to the Distributed Transaction Processing System 56 via line 38, of which the underlying technology is driven by the application of the Distributed Transaction Processing System 56.

The Transaction Gateway Client 40 allows the Server 18 to interoperate with the Transaction Processing System. When a Client 10, 12, 14 or 16 selects an enterprise based service, the request is routed to the Server 18, which in turn routes the request to the Transaction Gateway Client 40. The Transaction Gateway Client 40 determines the requested service and forwards the necessary information to the Distributed Transaction Processing System 54 and 56. The Distributed Transaction Processing System 54 and 56 processes the request against the Database 28 according to the specified request (e.g., select, update, delete). The Distributed Transaction Processing System 54 and 56 returns data and/or status information to the Transaction Gateway Client 40, which in turn formats the data in an appropriate manner for the Server 18. The Server 18 then returns the information to the requesting Client 10, 12, 14 and 16.

Figure 2A:
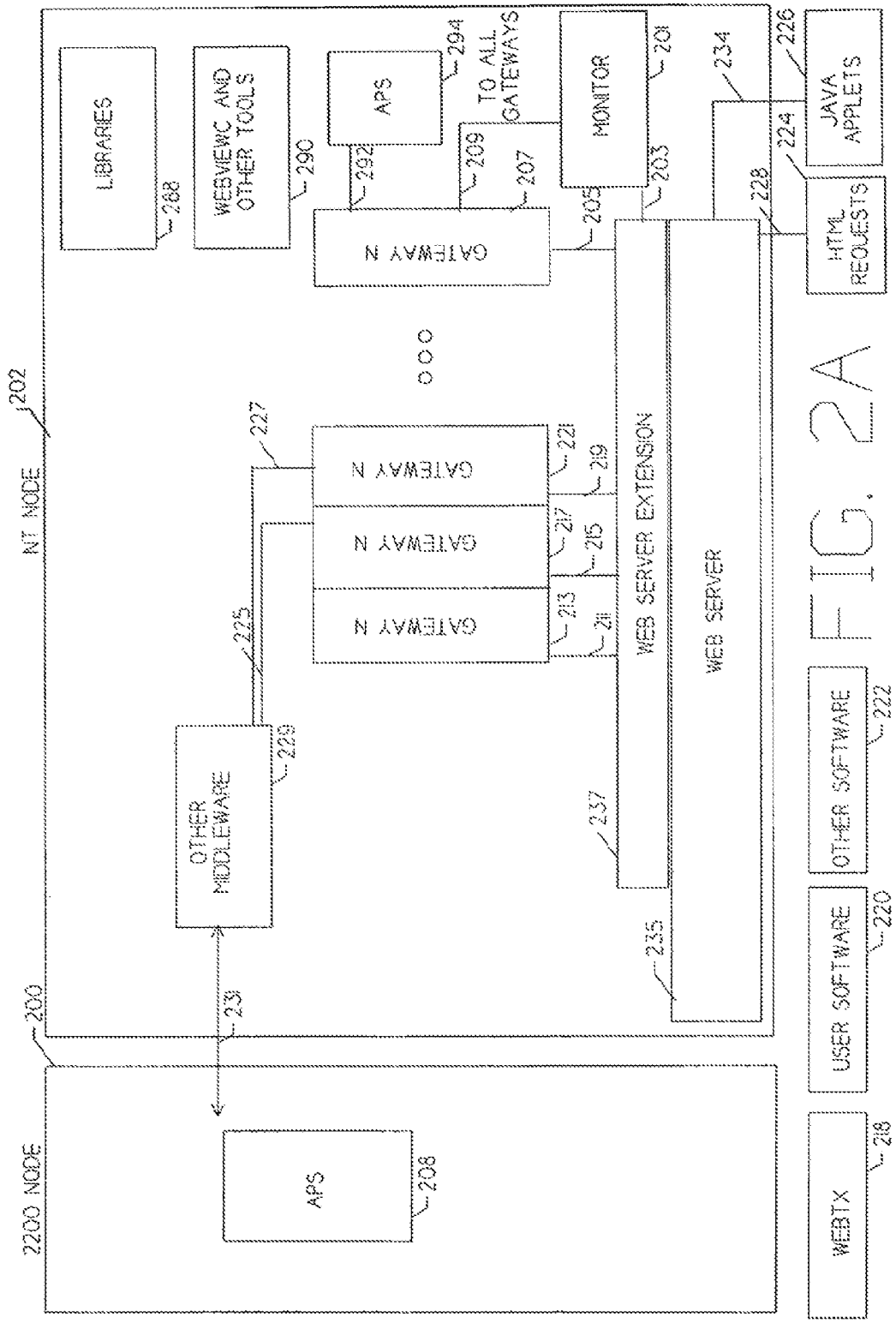
FIG. 2A is a functional block diagram of a generalized WebTx environment.

FIG. 2A is a functional block diagram of a generalized WebTx environment. In general, WebTx is middleware in a client/server computing environment which accepts requests from the client side and routes the requests to the correct place on the server side, then passes a response from the server side back to the client side. In the context of the present invention, WebTx "marries" a Microsoft DCOM client/server architecture (such as the NT node shown in 202) with a transactional client/server architecture (such as the Unisys 2200 enterprise node, as shown at 200).

The WebTx environment, as utilized in the present invention, is comprised of several components, including a Monitor 201, a Web Server Extension 237, one or more Gateways 213, 217, 221, and 207, the WebViewC compiler 290, and a set of libraries 288.

The WebTx Monitor 201 communicates with the Web Server Extension 237 via interface 203, and a Gateway 207 via interface 209. The Monitor 201 functions as the WebTx administrative tool. One function of the Monitor 201 is to start and stop the gateways 207, 213, 217, and 221, as needed. Within a Unix environment, the WebTx monitor module is known as WebMon, while under the Windows NT environment, the WebTx monitor module is known as WtxSvc.

The WebTx Web Server Extension component 237, is a run-time extension of the Web Server 235 (such as Netscape FastTrack, Netscape Enterprise, or Microsoft IIS). The function of the Web Server Extension 237 is to intercept requests intended for WebTx 218, and instead route the requests to the Gateways 207, 213, 217, and 221. The Web Server Extension 237 will also interpret the response from the Gateways, and route the reply. The Web Server Extension is connected to the Gateways 213, 217, 221 and 207 via interfaces 211, 215, 219 and 205. The Web Server Extension is connected to the Monitor 201 via interface 203, an HTML requestor component 224 via interface 228, and a Java Applet 226 via interface 234.

The Gateways 213, 217, 221 and 207 perform tasks which are grouped into conceptual areas. The Gateways 213, 217, 221 and 207 receive requests from the Web Server Extension 237 or from the Applications 212 and take whatever action is necessary to fulfill the request. This typically involves transforming a request (such as a URL from a Web Browser or remote procedure calls RPC's from a DCOM client) into a format which is understandable by a Distributed Transaction Processing System such as a Unisys 2200 Enterprise System 200. The Gateways 213, 217, 221 and 207 also transform data returned from the Distributed Transaction Processing System 200 into a formatted response which is returned to the requestor.

The WebViewC compiler 290 is used in conjunction with specific Gateway implementations, such as ViewGate, TUXGate, and JGate. The WebViewC compiler 290 compiles Open/OLTP view files generated on the OLTP enterprise system to create WebTx view files (.wv) and HTML files (.html). The WebViewC compiler is a free-standing component with no direct communication to any of the other components within the WebTx environment.

Other WebTx Components include libraries 288 such as the Software Development Kit (SDK) libraries, which provide framework and functions for building Custom Gateways. The SDK is specifically designed to allow customers to build their own gateways. Another type of library present within the WebTx system are Java Class Libraries, which provide class definitions for building JavaGate compatible applets.

Another tool 290 that may exist as a WebTx component is DGateAce. DGateAce is analogous to WebViewC, and is used specifically in conjunction with DGate, as part of the Unisys Pathmate system. DGateAce is further described in a co-pending application entitled, "AN AUTOMATED DEVELOPMENT SYSTEM FOR DEVELOPING APPLICATIONS THAT INTERFACE WITH BOTH DISTRIBUTED COMPONENT OBJECT MODEL (DCOM) AND ENTERPRISE SERVER ENVIRONMENTS". A further explanation of the relationship between DGateAce and DOCC may be found below in relation to the discussions of FIGS. 7 and 8.

Unix WebTx uses Inter-Process Communications (IPC) objects such as semaphores, shared memory, message queues and signals, while NT WebTx uses IPC objects such as handles, pipes, mutexes, and events.

Figure 2B:
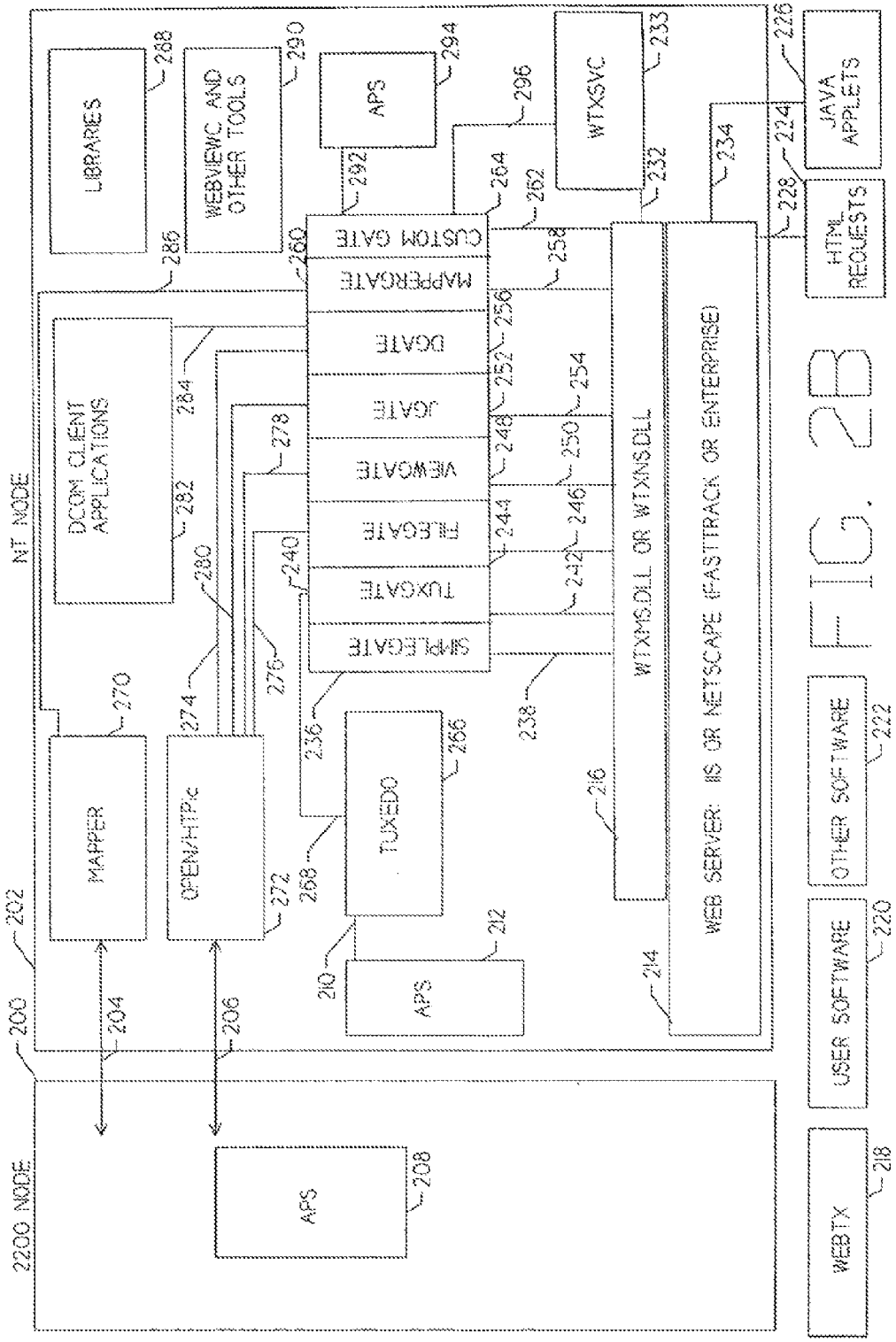
FIG. 2B is a functional block diagram of WebTx components utilized within a Microsoft NT environment.

FIG. 2B is a functional block diagram of WebTx components utilized within a Microsoft NT environment. This figure shows specific Gateway implementations within the Windows NT node. The SimpleGate Gateway 236 is specifically utilized as a test tool. It merely echoes a request. The TUXGate Gateway 240 provides generalized access to OLTP services through BEA TUXEDO 266. BEA TUXEDO acts as the hub for a distributed enterprise and Internet 3-tier applications. It provides an open environment that supports a wide variety of clients, databases, networks, legacy systems, and communications options. The FileGate Gateway 244 works in conjunction with a specific OLTP service to access textual files on the Unisys 2200 node. ViewGate 248 provides generalized access to OLTP services on the Unisys 2200 note (specifically HTML output). JGate 252 provides generalized Java applet access to OLTP services on the Unisys 2200 node. The DGate Gateway 256 provides generalized DCOM access to OLTP services on the Unisys 2200 node. The MapperGate Gateway 260 provides generalized access to Mapper applications within the Microsoft Windows NT environment. A Custom Gateway, such as shown at 264, provide a way for a customer to build their own Gateway to interface their own applications to an OLTP enterprise application.

Figure 3:
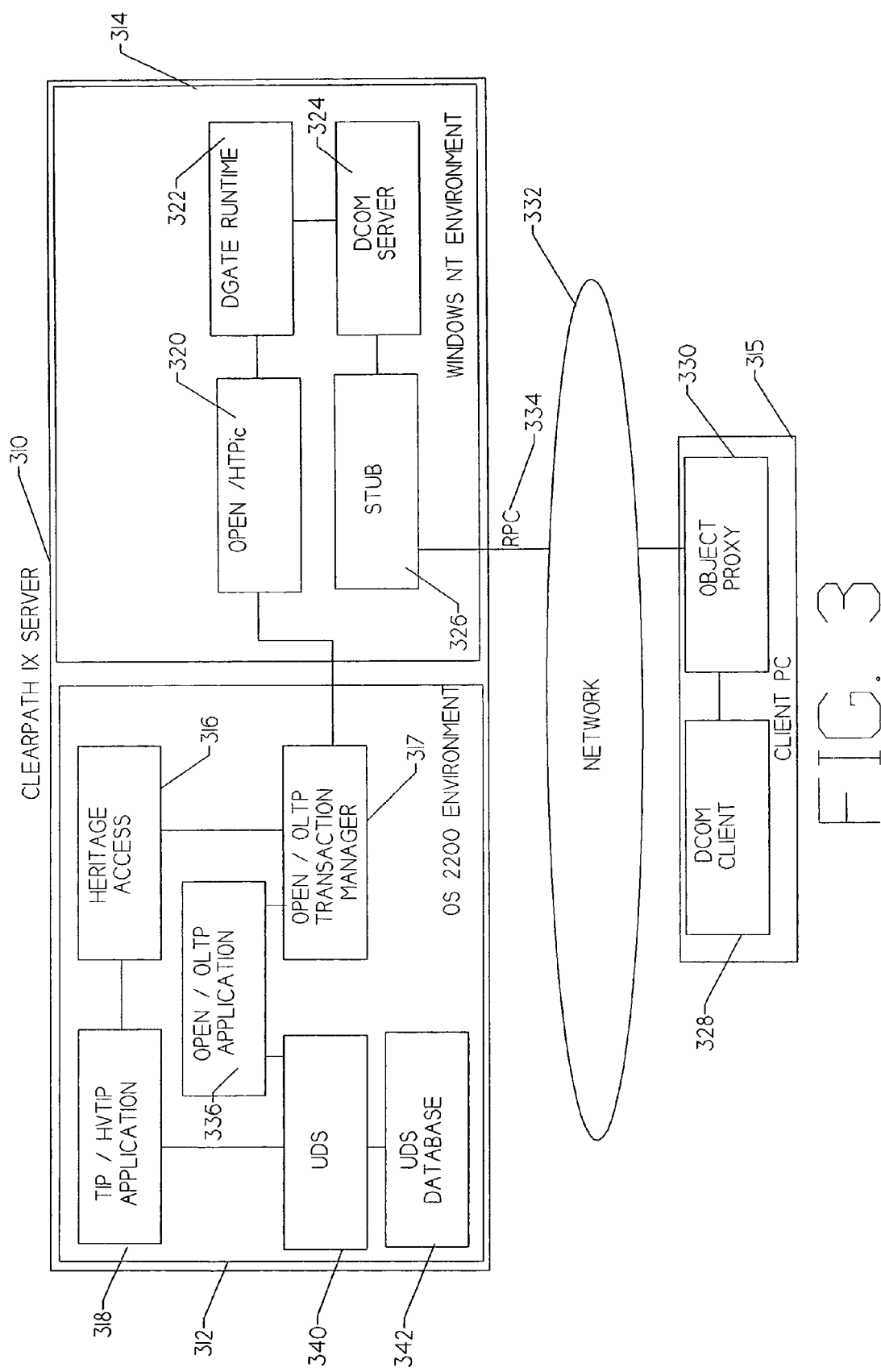
FIG. 3 is a diagram showing the relationship of the key software components of the present invention which allow DCOM clients to access enterprise applications.

FIG. 3 is a diagram showing the relationship of the key software components of the present invention which allow DCOM clients to access enterprise applications. The Unisys ClearPath IX Server 310 includes both an OS 2200 environment 312 and a Windows NT environment 314. All ClearPath HMP IX Servers 310 include On-Line Transaction Processing (OLTP) software that complies with the X/Open model for Distributed Transaction Processing (DTP). This enables client/server access to existing OLTP applications as well as allowing development of new, distributed client/server applications.

The X/Open DTP software provided for the OS 2200 environment 312 is TransIT Open/OLTP, available commercially from Unisys Corporation. The TransIT Open/OLTP Transaction Manager 317 is the base product for all Open/OLTP software in the OS 2200 environment 312. It includes: 1) a transaction monitor, which executes and routes transactions, performs load balancing, and recovers transactions after failures and 2) A communications resource manager (CRM), which controls communications among distributed applications.

The Open/OLTP Transaction Manager 317 includes interfaces to applications and to database systems (resource managers), including the Database Management System (DMS) and the Relational Database Management System (RDMS).

The OS2200 Environment also includes an Open/OLTP Heritage Application Access component 316. This component 316 allows use of existing OS 2200 OLTP applications, many without modification, as Open/OLTP server programs. This provides an easy way to provide GUI client/server access to existing applications. These Open/OLTP server programs can be Transaction Processing (TIP), High-Volume Transaction Processing (HVTIP) or other online batch programs (as shown at 318). Tools are provided for formatting the data from the existing program into Open/OLTP buffer formats.

When used with Open/OLTP, the present invention makes it possible to easily develop client applications that provide access to the following types of OS 2200 applications from a DCOM environment: 1) Native Open/OLTP applications (local), 2) native Open/OLTP applications that participate in distributed transactions with other platforms running Open/OLTP and BEA TUXEDO software, and 3) Heritage applications that use TIP, HVTIP, and DPS.

Existing transactions can be reused without modification, as long as they meet the following criteria: 1) Open/OLTP services must use the request/response model. Conversational services are not supported, and 2) Open/OLTP services must use X_C_TYPE or X_COMMON buffers. X_OCTET buffers are not supported.

The key software components that enable DCOM clients to access Open/OLTP applications reside in the Windows NT environment 314 of the ClearPath IX server 310. The Open/HTPic software component 320 is middleware which enables applications in the Windows NT environment to execute transactions against OS 2200 applications that use the Open/OLTP transaction manager 317. The DGate runtime software component 322 (DGate.exe) acts as a conduit between the Windows NT DCOM environment 314 and the Open/OLTP environment 312. The DCOM Server software component 324 accepts requests from DCOM Clients, repackages the parameters into the format required by the Open/OLTP transaction manager 317, and then forwards the parameters over a named pipe to the DGate runtime 322. The DCOM Server 324 could also include a variety of distributed objects. The stub software component 326 accepts remote procedure calls from object proxies on client PCs and converts them to interface calls to the DCOM Server application 324.

Basically, once created, the control generated in accordance with the present invention insulates the developer from concerns about many of the COM details. Prior to this invention, a developer, generating client software, was required to deal directly with these details.

The resulting DCOM Client components 328 reside in a Windows 95 or Windows NT Workstation environment on a personal computer 315. The DCOM Client program 328 provides a graphical user interface (GUI) for submitting transaction requests to the DCOM Server 324 and viewing the data it returns. The Object Proxy software component 330 converts requests from the DCOM client 328 to remote procedure calls (RPC) 334. The RPCs 334 are subsequently sent across a network 332 to the stub component 326 in the Windows NT environment 314.

In addition to the DGate runtime components, the present invention also includes a utility called DGateAce (not shown) that simplifies the process of defining the DCOM Client and Server programs used with the DGate runtime environment. DGateAce is further described in related patent application, Ser. No. 09/164,908, entitled, "AN AUTOMATED DEVELOPMENT SYSTEM FOR DEVELOPING APPLICATIONS THAT INTERFACE WITH BOTH DISTRIBUTED COMPONENT OBJECT MODEL (DCOM) AND ENTERPRISE SERVER ENVIRONMENTS", which is herein incorporated by reference.

Figure 4:
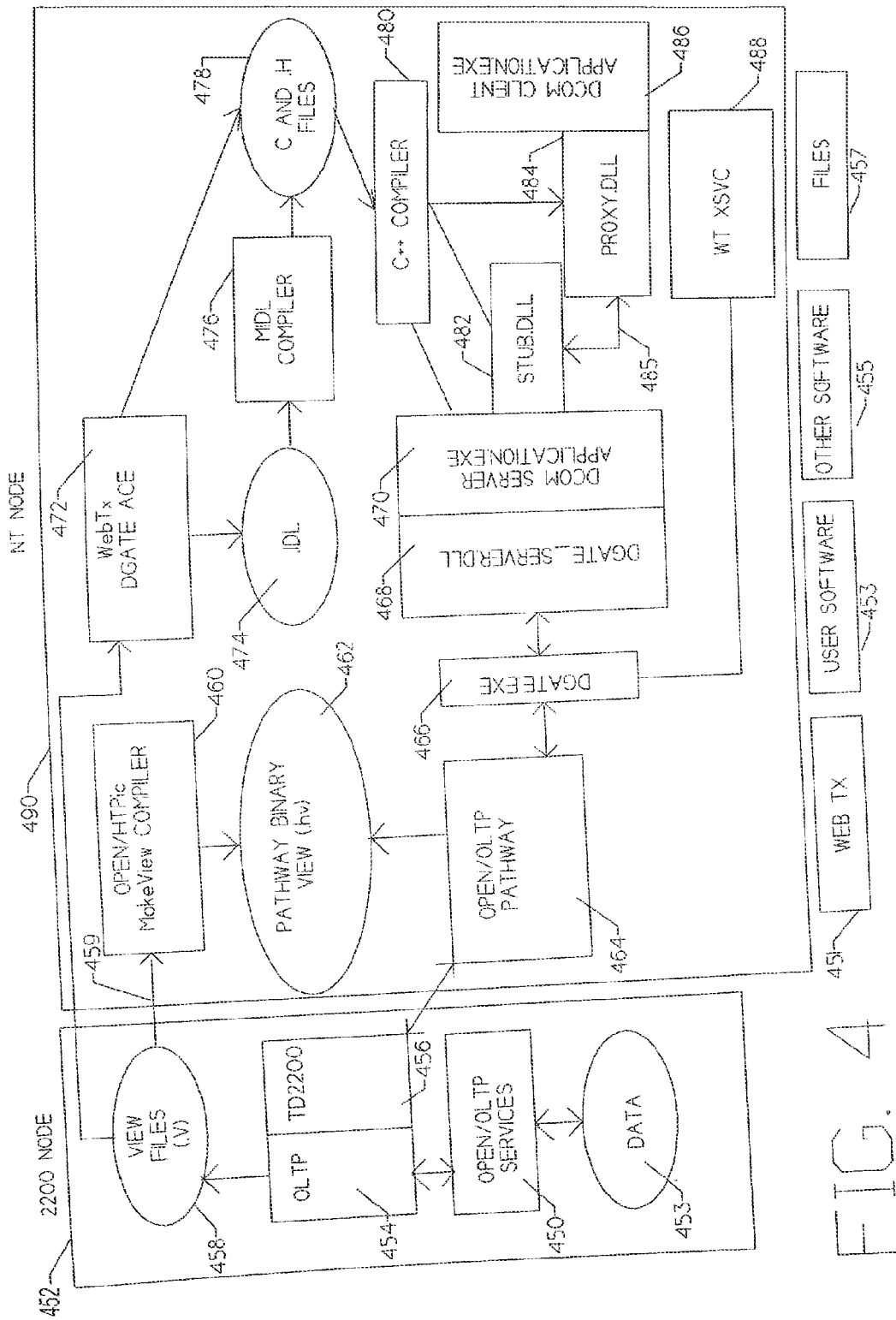
FIG. 4 is an illustration of the environment within which the present invention operates.

FIG. 4 is an illustration of the environment within which the present invention operates. Open/OLTP services 450 are created by a user on an enterprise server 452, such as a Unisys 2200. These services 450 are capable of operating under an OLTP-style transaction processing system. In a preferred embodiment, this OLTP-style system is X/Open compliant. The service 450 is designed to accomplish a specific task, for example, update a user's bank account balance following a debit or credit.

Each service is associated with an input view (.V) file 458 which defines how the input parameters will be provided to the service 450. In particular, the .V file 458 indicates where each input parameter is located in the view file, and the size and type of each input parameter. If a service 450 is to provide output to the user (for example, the updated account balance), another output view file is required to communicate how the information will be presented within the output view buffer.

For all services 450 that are to be accessed from a particular Windows NT node 490, the associated view files 458 must be copied (via FTP or other copy service, shown at 459) to that node 490. Once the view files 458 have been successfully copied to the Windows NT node 490, the MakeView compiler 460 is used to generate ".hv" files 462.

The WebTx DGateAce software component 472, further described in related application, Ser. No. 09/164,908, entitled, "AN AUTOMATED DEVELOPMENT SYSTEM FOR DEVELOPING APPLICATIONS THAT INTERFACE WITH BOTH DISTRIBUTED COMPONENT OBJECT MODEL (DCOM) AND ENTERPRISE SERVER ENVIRONMENTS", also must have access to the view files 458. DGateAce 472 uses the view files 458 to automatically generate files needed for an application to operate within a DCOM environment. These files include the DCOM Server Applcation.exe 470, the Stub.dll 482, and the Proxy.dll 484.

As explained above, the control created in accordance with the present invention provides the developer with a convenient means to generate clients which operate within the Distributed Component Object Model (DCOM), a Microsoft model for distributed object computing. Within the DCOM Server environment, a remote DCOM Client Application 486 can make a request. The DCOM client 486 can be any type of client, including a Visual Basic client, a C++ client, or a Web Browser with Active Server Pages (ASP). If the request made by the DCOM client 486 is a request for access to a remote process (interprocess request) the request is routed to proxy. dll 484. Proxy.dll 484 is a code segment which receives any client requests targeted for a remote server, and will facilitate the necessary interprocess communications. The proxy.dll 484 understands how to communicate with the Client 486, and also understands how to communicate over an interface 485 which is shared by two or more processes. The proxy.dll 484 "marshals" the request parameters into an independent format so that they may be provided by the client process 486 over the COM-based interface 485, which conforms with the Microsoft DCOM Model. The stub.dll 482, which also understands how to communicate over the common interface 485, "un-marshals" the parameters into a format that can be understood by the DCOM Server Application.exe 470. Thus, the DCOM environment allows machines with entirely different architectures (PCs, Workstations, etc.) to communicate using a common interface.

The specifics of the common interface are described in an Interface Definition Language (IDL) 474. The IDL 474 is operated on by the Microsoft Interface Definition Language (MIDL) compiler 476 to create a set of .c (C) and .h (header) files 478. Then, a second compiler (C++) 480 operates on the .c and .h files to create the stub.dll 482 and the proxy.dll 484. The proxy.dll 484 is linked to the DCOM Client Application.exe 486, and the stub.dll 482 is linked to the DOOM Server Application.exe 470, as provided by the control developed in accordance with the present invention.

Once the DCOM Server 470 un-marshals the parameters, the parameters are packaged into a single buffer and passed to the DGate-Server.dll 468. The DGate-Server.dll 468 and the DGate.exe 466 are the modules which "DCOM-enable" an OLTP enterprise server 452 such as the Unisys 2200 System.

Figure 5:
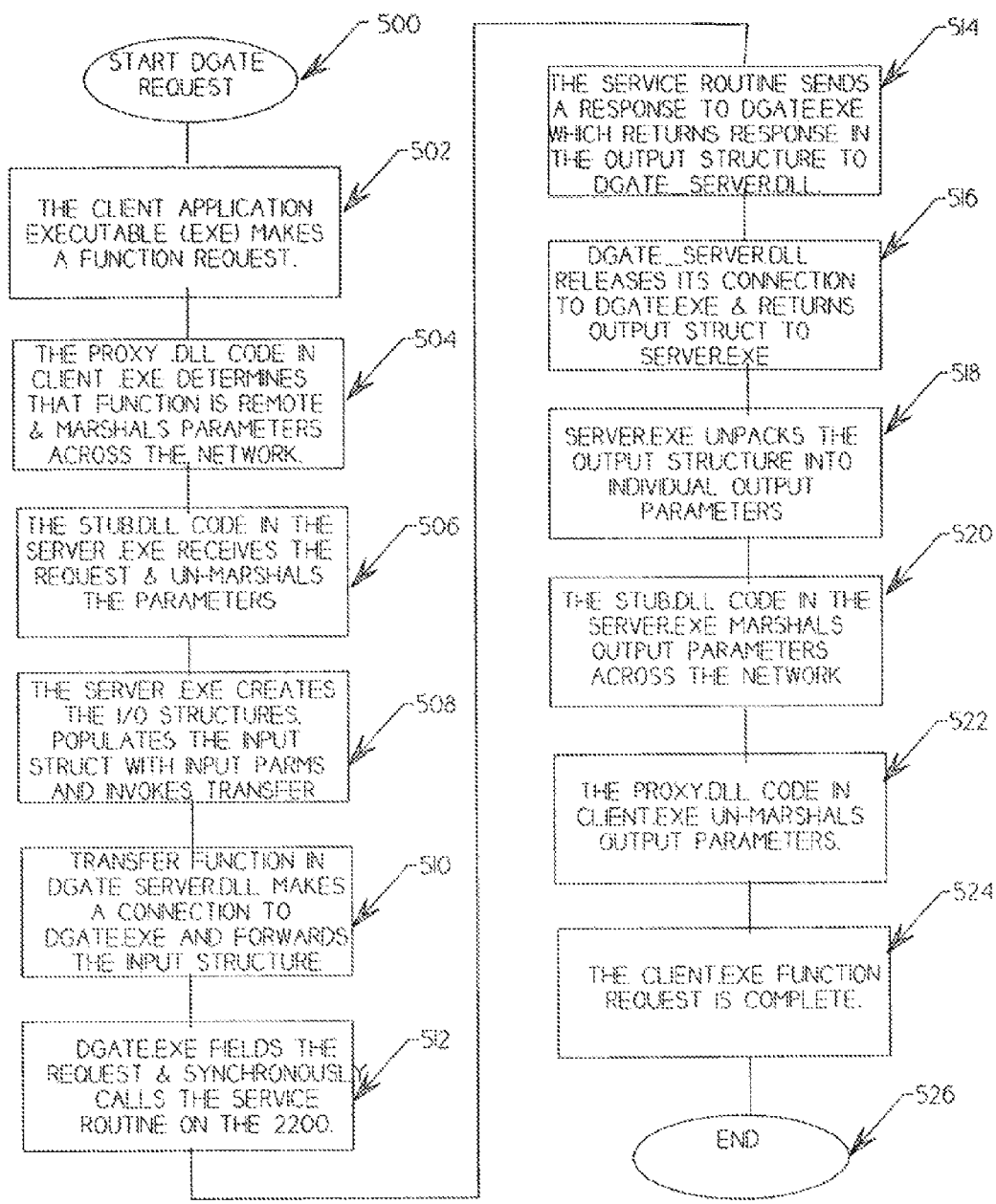
FIG. 5 is a flow diagram illustrating what happens when a request is issued by a client to an enterprise OLTP enterprise application.

FIG. 5 is a flow diagram illustrating what happens when a DCOM client generated by the control of the present invention makes a request of an enterprise OLTP enterprise application. The process begins at block 500, with the issuance of an OLTP function request from the client application executable, as shown at 502. Next, the proxy.dll code in the client executable, which is part of the generated control, determines if the function is remote, and if so, it marshals parameters across the network, as shown at 504. The proxy.dll accomplishes this function by converting requests from the DCOM client application to remote procedure calls.

The stub.dll code in the server executable receives the request from the proxy.dll, then un-marshals the parameters, as shown at 506. In other words, the stub accepts remote procedure calls from object proxies on client PCs and converts them to interface calls to the DCOM server application.

Next, the DGateAce-generated code in the Server.exe creates input and output buffers, populates the input buffer with individual input parameters, and invokes the TransferToGateway( ) function, as shown at 508. The TransferToGateway( ) function is located in the DGate_server.dll (FIG. 4, element 468). The TransferToGateway( ) function then makes a connection to the DGate executable and forwards the input buffer, as shown at 510.

The DGate executable (otherwise known as the DGate Runtime) acts as a conduit between the DCOM environment and the Open/OLTP environment. Thus, the DGate executable fields the request from the TransferToGateway( ) function and synchronously calls the service routine on the 2200 enterprise server, as shown at 512.

On the Unisys 2200, the request will first be handled by the TransIT Open/OLTP Transaction Manager, available commercially from Unisys Corporation, which is the base product for all Open/OLTP software in the OS 2200 environment. The Open/OLTP Transaction Manager includes interfaces to applications and to database systems (resource managers), including the Database Management System (DMS) and the Relational Database Management System (RDMS). The service routine on the enterprise OLTP system eventually sends a response back to the DGate executable, which reformats the response into an output buffer and returns the output buffer to the TransferToGateway( ) function in DGate_Server.dll, as shown at 514.

Next, the TransferToGateway( ) function in DGate_server. dll releases its connection to DGate.exe and returns the output buffer to the DGateAce-generated code in the server executable, as shown at 516. The DGateAce-generated code in the server executable unpacks the output buffer into individual output parameters, as shown at 518.

The stub.dll code in the server executable then marshals the output parameters back across the network to the DOOM client, as shown at 520. Finally, the proxy.dll code in the client executable un-marshals the output parameters, the control populates the appropriate control properties, and it is returned to the client application, as shown at 522. The client function request has now been successfully completed 524.

Figure 6:
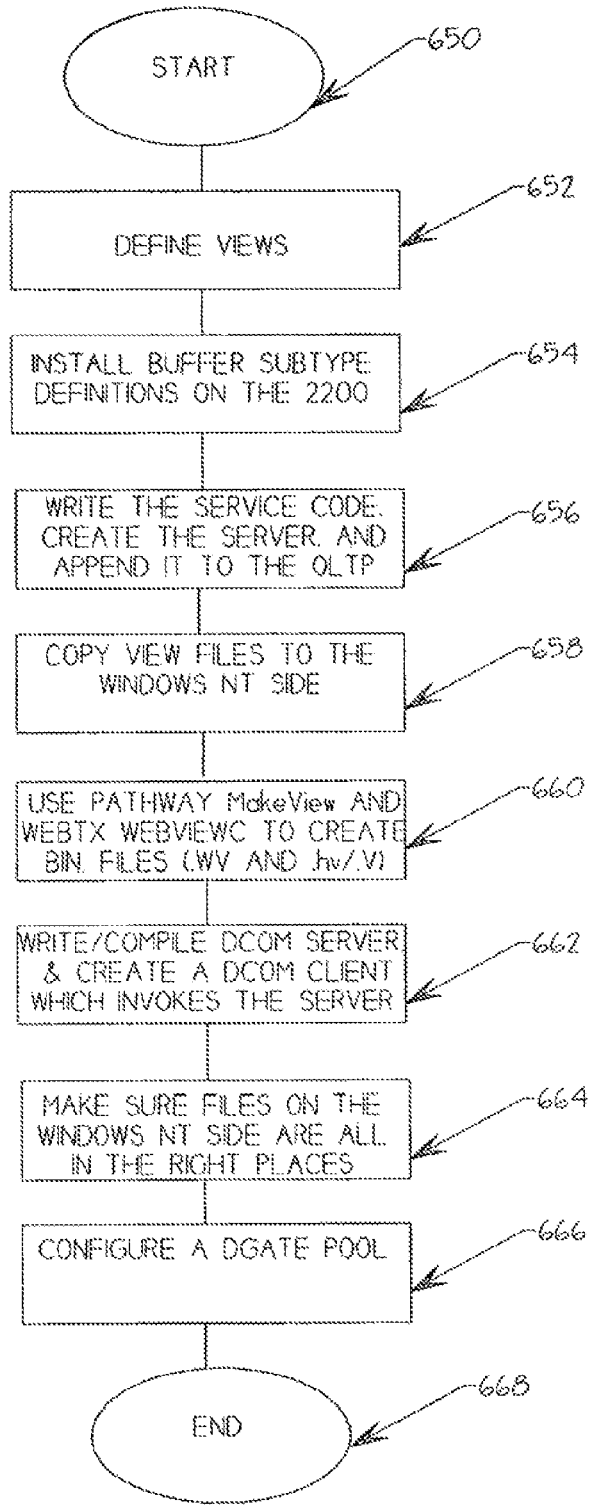
FIG. 6 is a flow diagram illustrating how to set up a DGate application.

FIG. 6 is a flow diagram illustrating how to set up a DGate application. Beginning at 650, the first step in the process is to define the view files 652. View file definitions show input and output parameters that will be received and transmitted to/from the On-Line transaction processing system application. In particular, the view file definitions indicate where each input/output parameter is located in the buffer subtype, and the size and type of each input parameter (e.g. whether the parameter is an 80-byte character string, a long integer, etc). If a service is to provide output to the user, another output view file definition is required to communicate how the information will be presented within the output view buffer.

Next, buffer subtype definitions must be installed on the Unisys 2200 OLTP enterprise system 654. Open/OLTP users X/Open typed buffers and user-defined buffer subtypes to define data structures. These structures ensure that applications programs can successfully exchange data, even when they reside on different types of machines. Unisys OLTP-TM2200 VIEW utilities are used to define and install buffer subtypes. When the buffer subtypes and defined and installed, the Unisys On-Line Transaction Processing Transaction Manager (OLTP-TM2200) encodes and decodes the buffer data on behalf of the application programs.

Following installation of the buffer subtype definitions on the 2200, the next step in setting up a DGate application is to write the service code, create the server, and append it to the 2200 OLTP 656. The MAS utility, a component of the OS2200 TransIT Open/OLTP Transaction Manager, is a processor that creates a runstream of Executive Control Language (ECL) statements that call OS2200 tools to build a server. The MAS utility is used to build extended mode and basic mode servers of all supported type (HVTIP, TIP, and batch).

Next, the view definition files which were defined on the 2200 Enterprise OLTP server are copied (via FTP, or other copy service) to the Windows NT Node 658. After the view definition files have been copied to the Windows NT node, the Pathway MakeView and WebTx WebviewC compiler are used to generate binary files (.WV and .hv/.V) 660.

A user must next write/compile a DCOM Server and create a DCOM Client which invokes the Server 662. In accordance with the present invention, the control creator insulates the developer from much of the detailed definition required to interface using the DCOM protocol. The DCOM Server must be written in C or C++. Developing a DCOM Sever is a three step process: 1) a developer must design the classes the server should expose; 2) a developer must define the interfaces the classes will support; and 3) a user must implement the classes' methods. In the context of DGate, designing classes is a matter of selecting the Open/OLTP services (transactions) and associated view buffers that are to be accessed from the DCOM application. A developer will use the Interface Definition Language (IDL) to define the interfaces the classes will support and then optionally create a type library on the object server system. The DGateAce tool, further described in a related application entitled, "AN AUTOMATED DEVELOPMENT SYSTEM FOR DEVELOPING APPLICATIONS THAT INTERFACE WITH BOTH DISTRIBUTED COMPONENT OBJECT MODEL (DCOM) AND ENTERPRISE SERVER ENVIRONMENTS", provides a time-saving tool for producing an IDL file for a DCOM server that uses DGate.

Once a class design and its interface definitions are complete, a designer must provides implementations of the class methods. If the purpose of the DCOM server is exclusively to access Open/OLTP services, this is a straightforward task. Most of the work is handled by function files that DGateAce produces. The developer only needs to develop a main program that references the functions and handles status codes.

After the DCOM Server/Client have been created, the developer must make sure that all files on the Windows NT side are all in the right places 664, and a DGATE pool must be configured 666.

Figure 7:
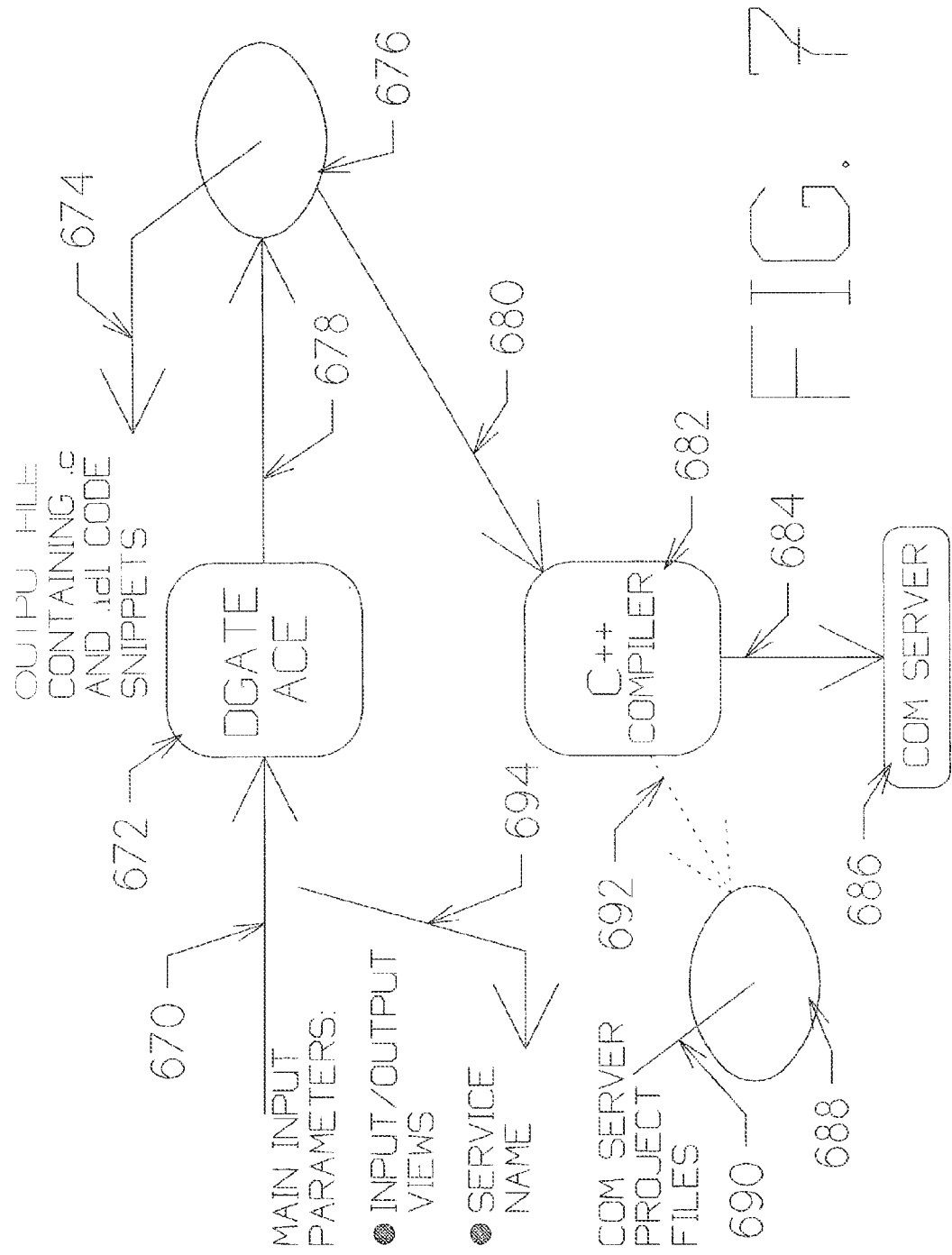
FIG. 7 is a flow diagram showing the DGate development process.

FIG. 7 is a flow chart showing the DGate development process. Main input parameters 670, including input/output views and service name 694, are presented to DGate Ace 672. These main input parameters are to be utilized in the execution of a 2200 service. DGate Ace 672 wraps the 2200 services to provide ease of DCOM Client interaction. A more detailed description of the operation of DGate Ace 672 is available in the above identified, commonly assigned, related U.S. Patent Application, incorporated by reference.

DGate Ace 672 creates an output file containing the proper snippets of .c and .idl code for use by the 2200 service (see also FIG. 4). These data are assembled at temporary store 676. C++ compiler 682 accesses these data via path 680. The compiled code is transferred to com server 686 for use on the internet. Compiled code is also presented to storage 688 for eventual transfer via path 690 for com server project files.

Figure 8:
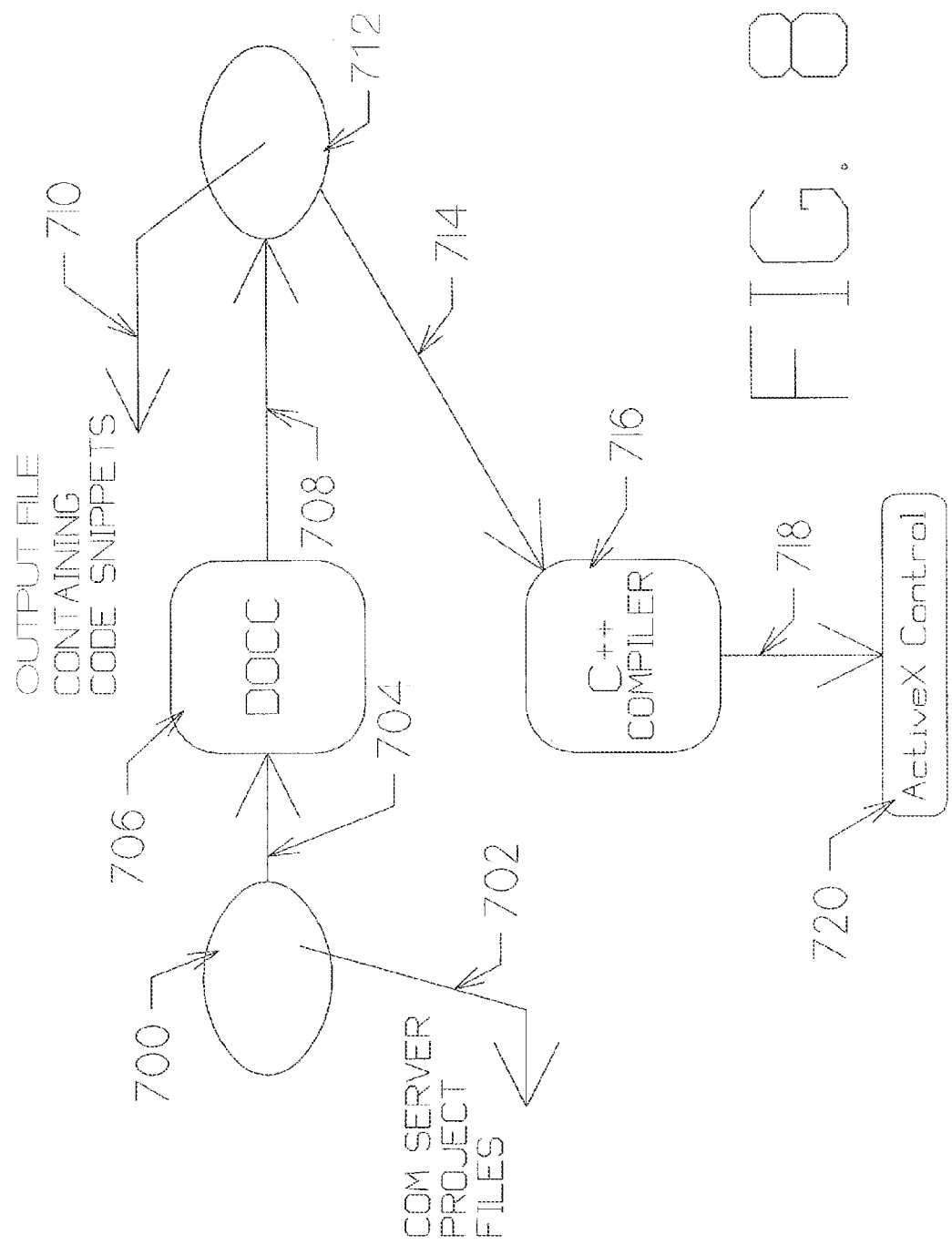
FIG. 8 is a flow diagram showing the development of a control in accordance with the present invention.

FIG. 8 is a flow chart showing the DOCC development process. Com server project file data is received via path 702 and temporarily stored at element 700. The DCOM Object Control Creator of the preferred mode of the present invention accesses this data via path 704. DOCC 706 produces the code snippets 710 defining the inputs and outputs of the desired 2200 service. These code snippets are temporarily stored at element 712 until transferred to C++ Compiler 716 via path 714. The compiled code is transferred via path 718 to ActiveX Control 720 for use by the DCOM Client.

Figure 9:
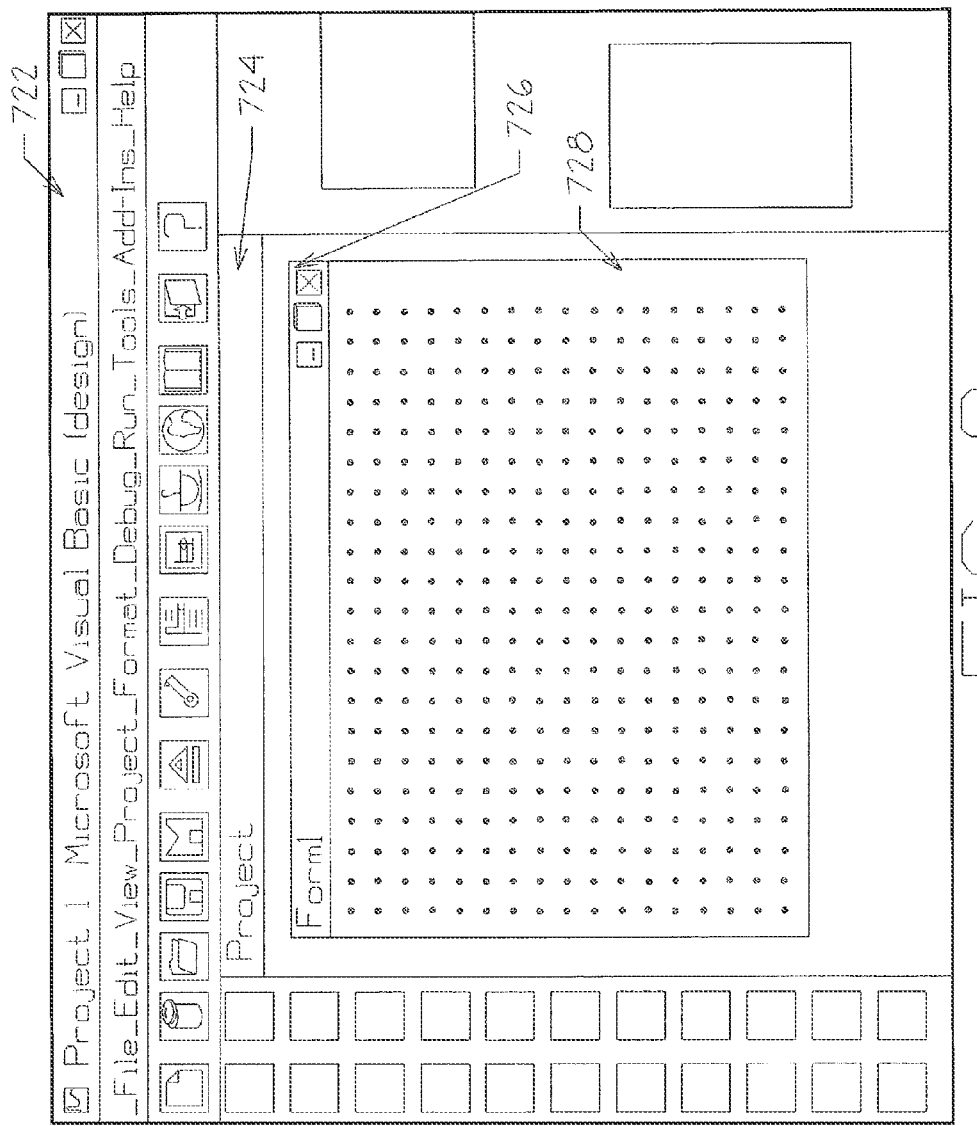
FIG. 9 is a screen used for the generation of the control.

FIG. 9 is a view of window 722 for the creation of the client application using the control of the present invention. Those of skill in the art are familiar with the use of Microsoft Visual Basic.

As is known by those of skill in the art, window 724 is labeled and utilized to create the project. Window 726 is provided for defining the form for the client application which uses and incorporates the control. This form is drawn on window surface 728 in the manner known in the art.

Figure 10:
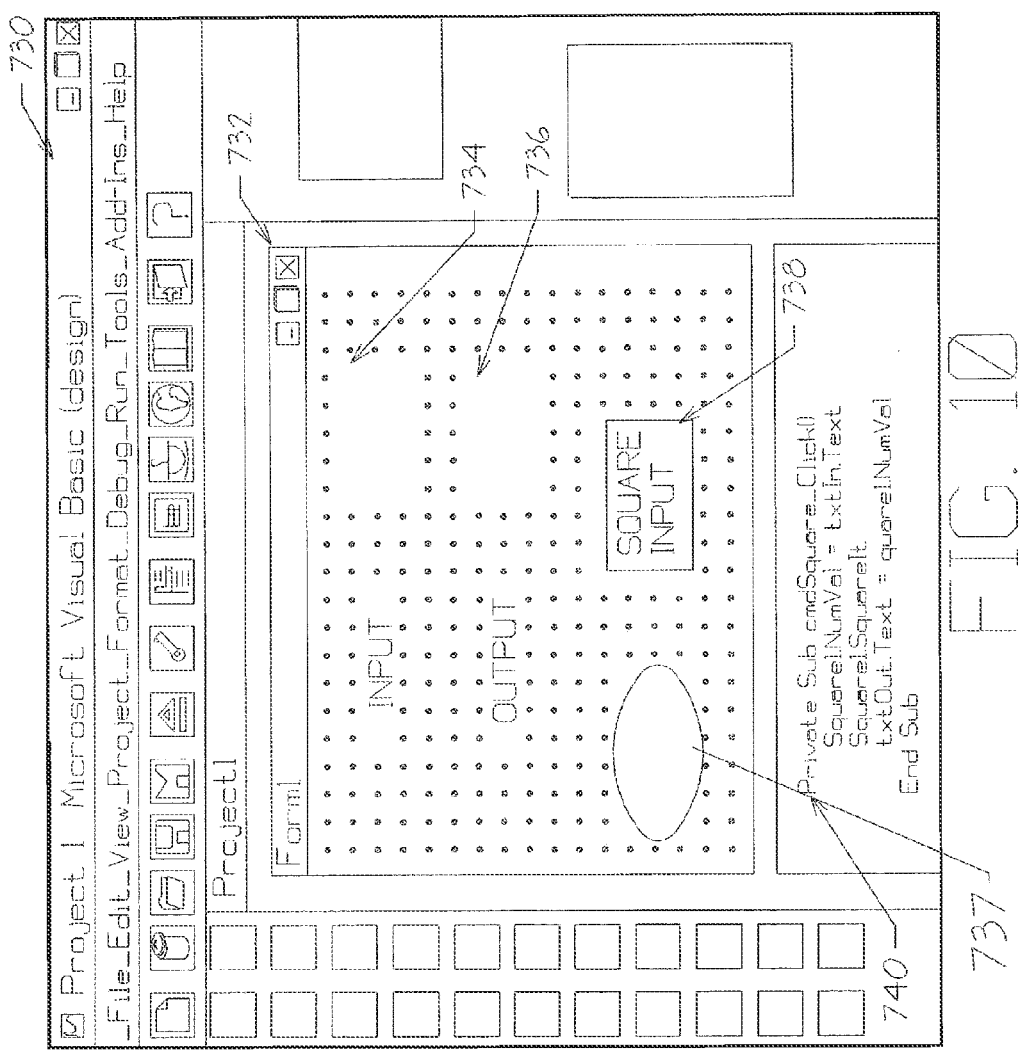
FIG. 10 is a screen showing development of a sample control.

FIG. 10 is a view of window 730 showing the form as defined by the client application developer for an example service. For this simple example, the service to be called provides as an output, the arithmetic square of a DCOM Client supplied input number. Window 732 contains the form as designed. Variable space 734 provides a place wherein the user of the service can specify the input number. Variable space 736 provides a place wherein the 2200 service may place the output number. Button 738 is provided to initiate the squaring process via the control. The actual control created prior to the client creation is represented by oval 737.

Script 740 shows the script written by the application developer that invokes the control's method.

Figure 11:
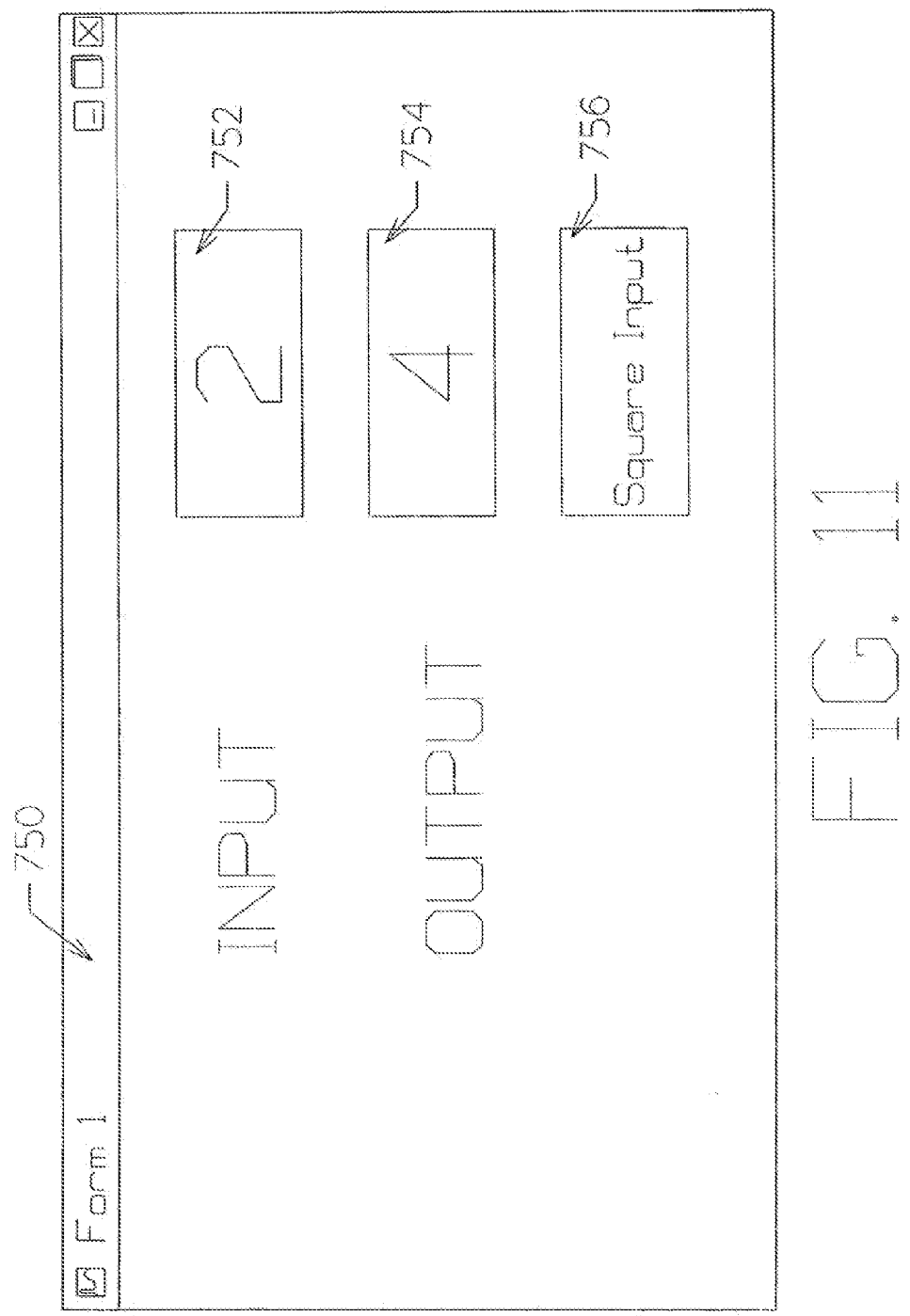
FIG. 11 is a screen showing the input and output of the sample control.

FIG. 11 is a view of window 750 as seen by the DCOM Client utilizing the example control. As a sample use of this control, input number 752 is provided by the user. Button 756 is clicked and the call is made to the corresponding 2200 service. Output number 754 yields the result and makes it available to the requesting DCOM Client.

FIG. 12 is a listing of HTML within a web page that contains the <OBJECT> tag that defines and references the control and also the script contained within the <SCRIPT></SCRIPT> tag pair to invoke the control.

Figure 13:
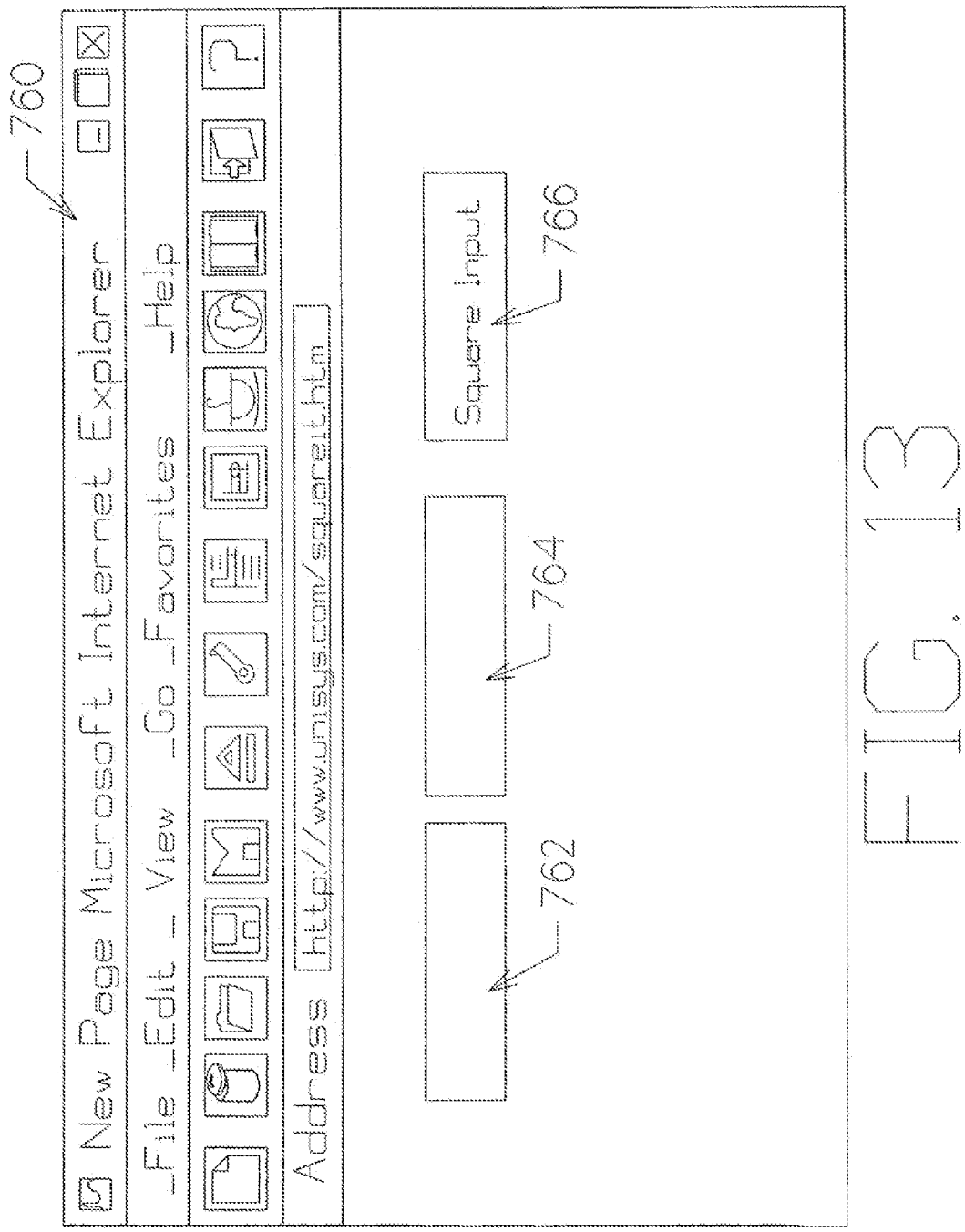
FIG. 13 is an Internet Explorer window for the sample problem.

FIG. 13 is a view of window 760 representing communication with the 2200 enterprise server via Microsoft Internet Explorer for the chosen example. This window provides space 762 for the input number and space 764 for the output number. Button 766 initiates the operation.

Figure 14:
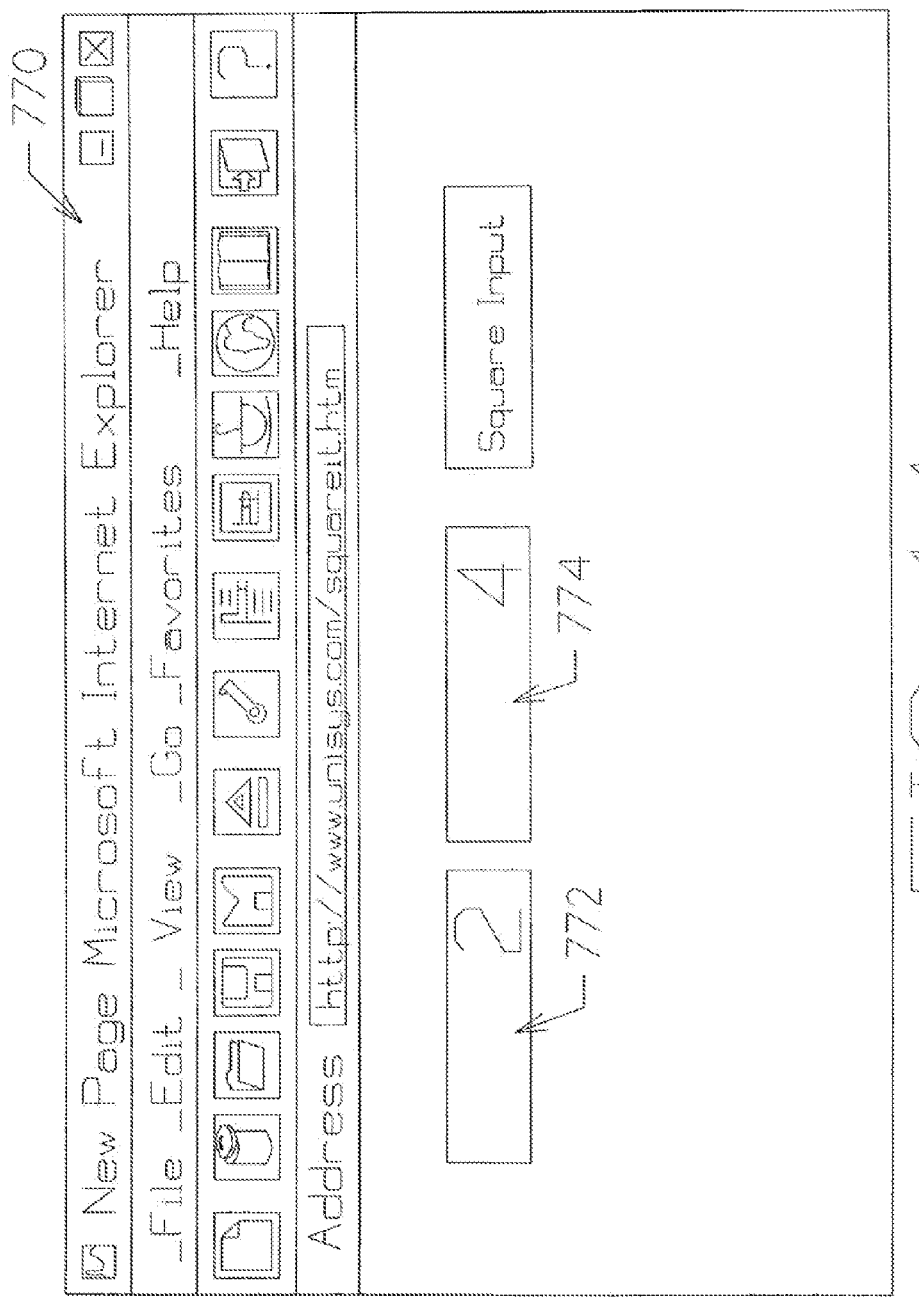
FIG. 14 is an Internet Explorer window for return of the sample answer.

FIG. 14 is a view of window 770 showing completion of the requested sample service. Input number 772 has been squared by the 2200 enterprise service and output 774 provides to the DCOM Client user.

Having thus described the preferred embodiments of the present invention, those of skill in the art will readily appreciate that the teachings found herein may be applied to yet other embodiments within the scope of the claims hereto attached.

I claim:

1. A method for accessing an enterprise service located on an enterprise server from a client terminal which generates a service request operating in a DCOM environment, comprising:
   a. generating an interface program by a software facility that converts said service request into a format useable by said enterprise service using an industry standard scripting language at said client terminal;
   b. building an input buffer containing input parameters associated with said service request; and
   c. using said interface program for creating a dialog with said enterprise server which converts required inputs and outputs,
   wherein said enterprise server contains an On-Line Transaction Processing system having a Pre-DCOM architecture operating outside of the DCOM environment.

2. A method according to claim 1, wherein said client terminal is an industry standard personal computer.

3. A method according to claim 2, wherein said enterprise server comprises a Unisys 2200 data processing system.

4. A method according to claim 3, wherein said industry standard scripting language comprises Visual Basic.

5. A method for communicating between a DCOM client and an enterprise server, comprising:
   a. building a transfer buffer containing a service call and an appropriate set of input parameters by said DCOM client;
   b. transferring said transfer buffer from said DCOM client to a DCOM server;
   c. building an input buffer by said DCOM server using said appropriate set of input parameters from said transfer buffer;
   d. passing said input buffer from said DCOM server to a DCOM gateway;
   e. forwarding said input buffer from said DCOM gateway to a communications program; and
   f. sending said input buffer from said communications program to said enterprise server.

6. A method according to claim 5, wherein said passing step occurs via a standard pipe.

7. A method according to claim 6, wherein said communications program further comprises an Open/OLTP Pathway program.

8. A method according to claim 7, further comprising honoring said service call.

9. A method according to claim 8, wherein said honoring step further comprises building an output buffer.

10. An improvement in a DCOM environment employing a plurality of client terminals which prepare service requests in a first transaction language, the plurality of client terminals communicatively coupled to an enterprise server with a pre-DCOM architecture operating outside of the DCOM environment and having an enterprise service accessible in a second transaction language, the improvement comprising:
    a. a software facility embedded in a non-transitory computer-readable medium, which automatically generates interface software code in an industry standard scripting language in response to said service requests, which also permits said plurality of client terminals to access said enterprise service by converting said service requests from said first transaction language to said second transaction language and placing said converted service requests into an input buffer,
    wherein said enterprise server is a pre-DCOM On-Line Transaction Processing system and said second transaction language is consistent with the pre-DCOM On-Line Transaction Processing system.

11. An improvement of claim 10, wherein said industry standard scripting language is Visual Basic.

12. An improvement of claim 11, wherein said one of said plurality of client terminals is an industry standard personal computer.

13. An improvement of claim 12, wherein said enterprise server is Unisys 2200 data processing system.

14. A system comprising:
    a. a plurality of client terminals in a DCOM environment which generate service requests in a first language and build a parameter buffer of appropriate parameters;
    b. an enterprise server having a pre-DCOM architecture operating outside of the DCOM environment communicatively coupled to said plurality of client terminals via a network;
    c. an enterprise service resident in and operable on said enterprise server and accessible in accordance with a second language; and
    d. a software program stored in a non-transitory computer-readable medium resident in one of said plurality of client terminals, which automatically scripts a software interface using an industry standard scripting language to convert said first language of said plurality of client terminals to said second language of said enterprise service and build an input buffer from said parameter buffer,
    wherein said enterprise server is a pre-DCOM On-Line Transaction Processing system and said second language is consistent with the pre-DCOM On-Line Transaction Processing system.

15. A system according to claim 14, wherein said one of said plurality of client terminals is an industry standard personal computer.

16. A system according to claim 15, wherein said industry standard scripting language is Visual Basic.

17. A system according to claim 16, wherein said enterprise server is Unisys 2200 data processing system.

18. A system comprising:
    a. interacting means for a client to interact with a DCOM system in a DCOM environment;
    b. an industry standard script generating means located within said interacting means;
    c. providing means communicatively coupled to said interacting means that provides an enterprise service via an On-Line Transaction Processing system having a Pre-DCOM architecture operating outside of the DCOM environment;
    d. creating means located within said interacting means for creating an interface software code using said industry standard script generation means for converting service requests from said interacting means to a language useable by said enterprise service; and
    e. building means associated with said creating means for building an input buffer containing a plurality of input parameters.

19. A system according to claim 18, wherein said interacting means further comprises an industry standard personal computing means.

20. A system according to claim 19, wherein said providing means comprises Unisys 2200 data processing system.

21. A system according to claim 20, wherein said industry standard script generating means comprises Visual Basic.

* * * * *